United States Patent
Ellison et al.

(10) Patent No.: US 8,796,165 B2
(45) Date of Patent: *Aug. 5, 2014

(54) ALKALINE EARTH ALUMINO-BOROSILICATE CRACK RESISTANT GLASS

(75) Inventors: Adam James Ellison, Painted Post, NY (US); Timothy Michael Gross, Waverly, NY (US)

(73) Assignee: Corning Incorporated, Corning, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/291,533

(22) Filed: Nov. 8, 2011

(65) Prior Publication Data

US 2012/0135852 A1 May 31, 2012

Related U.S. Application Data

(60) Provisional application No. 61/418,117, filed on Nov. 30, 2010.

(51) Int. Cl.
*C03C 3/091* (2006.01)
*C03C 3/093* (2006.01)

(52) U.S. Cl.
USPC ............................................. 501/66; 501/67

(58) Field of Classification Search
USPC ...................................................... 501/66, 67
See application file for complete search history.

(56) References Cited

U.S. PATENT DOCUMENTS

| 6,831,029 B2 * | 12/2004 | Chacon et al. | 501/66 |
| 7,763,559 B2 * | 7/2010 | Kurachi et al. | 501/66 |
| 8,383,530 B2 * | 2/2013 | Kurachi et al. | 501/66 |
| 8,399,370 B2 * | 3/2013 | Niida et al. | 501/66 |
| 2008/0206494 A1 * | 8/2008 | Kurachi et al. | 428/1.62 |
| 2012/0135853 A1 * | 5/2012 | Amin et al. | 501/66 |
| 2012/0141668 A1 * | 6/2012 | Nakashima | 427/128 |
| 2013/0037105 A1 * | 2/2013 | Aitken et al. | 136/258 |

FOREIGN PATENT DOCUMENTS

| CN | 101092280 A | 12/2007 |
| DE | 4213579 | * 10/1992 |
| JP | 2001348247 | * 12/2001 |

(Continued)

OTHER PUBLICATIONS

V. Le Houerou et al; "Surface Damage of Soda-Lime-Silica Glasses: Indentation Scratch Behavior"; Journal of Non-Crystalline Solids, 316, (2003) 54-63.

P.H. Kobrin et al; "The Effects of Thin Compressive Films on Indentation Fracture Toughness Measurements"; Journal of Materials Science, 24, (1989) 1363-1367.

R. Tandon et al; "Indentation Behavior of Ion-Exchanged Glasses"; J. Am. Ceram. Soc. 73 [4] 970-977 (1990).

(Continued)

*Primary Examiner* — Karl Group
(74) *Attorney, Agent, or Firm* — Timothy M Schaeberle (57) ABSTRACT

The present disclosure relates to glass articles for use as a touchscreen substrate or cover glass article for use in a portable electronic device, particularly an aluminoborosilicate glass being substantially free of alkalis, comprising at least 55 mol % $SiO_2$, at least 5 mol % $Al_2O_3$ and at least one alkaline earth RO component. The alkali-free aluminoborosilicate exhibits an $Al_2O_3+B_2O_3$ to RO mol % ratio which exceeds 1 and an $Al_2O_3$ to RO mol % ratio which exceeds 0.65. The aluminoborosilicate glasses disclosed herein exhibits high damage resistance as evidenced by a Vickers median/radial crack initiation load which is greater than than 1000 gf, as well as a high scratch resistance of at least 900 gf, as measured by the lack of the presence of lateral cracks when a load is applied by a moving Knoop indenter.

9 Claims, 3 Drawing Sheets

(56) References Cited

FOREIGN PATENT DOCUMENTS

| JP | 2004168579 | * | 6/2004 |
| JP | 2006213595 | * | 8/2006 |
| JP | 2006347795 | * | 12/2006 |
| JP | 2009013049 | * | 1/2009 |
| WO | 8902877 | * | 4/1989 |
| WO | 2007/138832 A1 | | 12/2007 |

OTHER PUBLICATIONS

R. Tandon et al; "Surface Stress Effects on Indentation Fracture Sequences"; J. Am. Ceram. Soc. 73 [9] 2619-2627 (1990).
PCT/US11/062294 Search Report, Mar. 2012.
International Preliminary Report on Patentability & Written Opinion mailed Jun. 4, 2013 for International Patent Application No. PCT/US2011/062294 filed Nov. 29, 2011.

* cited by examiner

ALKALINE EARTH ALUMINO-BOROSILICATE CRACK RESISTANT GLASS

CROSS-REFERENCE TO RELATED APPLICATIONS

This application claims the benefit of priority under 35 U.S.C. §119 of U.S. Provisional Application Ser. No. 61/418,117 filed on Nov. 30, 2010 the content of which is relied upon and incorporated herein by reference in its entirety.

TECHNICAL FIELD

Disclosed herein are glass materials suitable for use as durable touchscreen substrates and cover glass articles for use in portable electronic devices. In particular, disclosed are alkaline earth borosilicate glasses exhibiting high crack and scratch resistance which can be used as portable electronic device touchscreen substrates and cover glass articles.

BACKGROUND

Highly crack resistant glasses are used for cover glasses/displays in electric devices, both portable and stationary. Typically, the high crack resistance is achieved through the ion-exchange of alkali containing glasses, such as soda-lime silicates, alkali boroaluminosilicates, and alkali aluminosilicates (e.g., Corning® Gorilla® glasses such as Code 2317 and Code 2318). The small alkali ions within the glass (e.g., lithium, sodium, or both) are replaced by a larger alkali (potassium) ions, and on cooling to room temperature the exchanged layers on either face of the sheet exhibit substantial compressive stress, while the interior of the sheet exhibits tensile stress. The compressive stress serves as a barrier, in effect, to crack initiation and propagation. In particular, the compressive stress thwarts formation of median/radial and lateral cracks that propagate away from the locus of an initial flaw. Median/radial cracks are of particular interest since their orientation is perpendicular to the surface of the glass and thus act as strength limiting flaws during bending of a glass sheet.

One measure of crack resistance is the load required to generate median/radial cracks using a Vicker's diamond indenter. For example, Corning® Gorilla® glass Code 2317 before ion exchange requires about 300 grams of force (go to produce median/radial cracks using a Vickers diamond indenter tip, while after ion exchange, the force required to produce median/radial cracks increases to approximately 5000 grams. This sizeable improvement in the load required to produce median/radial cracks is a key reason why Code Corning® Gorilla® glass 2317 is finding increasing use in consumer electronics applications.

While highly desirable for ion-exchange performance, alkalis are detrimental to certain consumer electronics applications, particularly those in which the glass is a substrate for use in semi-conductor based electronics, such as a display or integrated touch applications. This is because alkalis can move into the semiconductor layers, impacting switching voltages. Furthermore, as sheets become thinner, the maximum compressive stress that can be obtained for a given compressive layer thickness diminishes because of strain through the thickness of the glass. In addition, ion exchange must be performed on each part obtained from a sheet, rather than on the entire sheet before creating parts, because division of an ion exchanged sheet into two or more parts exposes the region under central tension and severely compromise the strength of the edge. Ion exchange can be time consuming and expensive, and in applications requiring large numbers of parts, ion exchange capacity can severely limit overall throughput of finished parts. Finally, in practical terms the amount of compressive stress that can be installed via ion exchange is not arbitrarily large. This is because once the central tension for a given glass exceeds a particular value, a flaw that penetrates through the layer of compressive stress causes an abrupt and catastrophic release of energy, causing the part to break violently into many pieces. This maximum level of installed central tension is referred to as the frangibility limit. Exceeding the frangibility limit must be avoided at all cost for cover glass and integrated touch applications.

For these reasons, it is desirable to identify compositions that are intrinsically resistant to formation of cracks, meaning without requiring ion exchange. It is further desired that such glasses be substantially free of alkalis so that they can be freely used as substrates for electronics applications. It is also desirable that the glasses possess viscoelastic properties, molar volumes, coefficients of thermal expansion, durabilities, etc. such that they can be used in typical consumer electronics applications, e.g., as cover plates or as substrates for integrated touch applications. Such glasses would have the additional advantage relative to ion-exchanged glasses in that they are intrinsically nonfrangible.

SUMMARY

Disclosed herein are alkaline earth borosilicate glasses article which exhibit improved damage/crack and scratch resistance and which are particularly suitable for use as a touchscreen substrate and/or cover glass articles for use in portable electronics.

In one embodiment these alkaline earth aluminoborosilicate glass are substantially free of alkalis and are comprised of the following: (1) at least 55 mol % $SiO_2$: (2) at least 5 mol % $Al_2O_3$; (3) at least one alkaline earth RO; (4) an $Al_2O_3$+$B_2O_3$ to RO mol % ratio which exceeds 1; and, (4) an $Al_2O_3$ to RO mol % ratio which exceeds 0.65. The aluminoborosilicate glasses disclosed herein additionally exhibit the following properties: (1) a Vickers indentation crack initiation load which is greater than 1000 gf; (2) a scratch resistance of at least 900 gf, as measured by the lack of the presence of lateral cracks when a load is applied by a moving Knoop indenter; (3) a Young's modulus value<75 GPa; and, (4) a molar volume>27.5 $cm^3$/mol.

According to a second embodiment, the alkaline earth aluminoborosilicate glass comprises: 55-75 mol % $SiO_2$, 8-15 mol % $Al_2O_3$, 10-20 mol % $B_2O_3$; 0-8% MgO, 0-8 mol % CaO, 0-8 mol % SrO and 0-8 mol % BaO.

The alkali-free aluminosilicate glass touchscreen substrate/cover glass articles disclosed herein can be used in a variety of consumer electronic articles, for example, cellphones and other electronic devices such as music players, notebook computers, PDA's, game controllers, electronic book readers and other devices requiring touchscreen capability.

Additional features and advantages of the embodiments described herein will be set forth in the detailed description which follows, and in part, will be readily apparent from that description or recognized by practicing the embodiments described herein, including the detailed description which follows, the claims, as well as the appended drawings.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

DETAILED DESCRIPTION

As used herein the terms "touchscreen" is used to refer to touchscreens of all kinds but in particular capacitive including multi-touch sensor touchscreens for use with portable, as well as non-portable consumer electronic devices. In particular, the term includes those touchscreens which are made through the deposition of single or multiple layers of indium tin oxide (ITO) on a transparent substrate that is either placed over a display panel or integrated to a display panel.

In the following description, whenever a group is described as comprising at least one of a group of elements and combinations thereof, it is understood that the group may comprise, consist essentially of, or consist of any number of those elements recited, either individually or in combination with each other. Similarly, whenever a group is described as consisting of at least one of a group of elements or combinations thereof, it is understood that the group may consist of any number of those elements recited, either individually or in combination with each other. Unless otherwise specified, a range of values, when recited, includes both the upper and lower limits of the range as well as any sub-ranges therebetween.

As is described herein below, the needs of the industry for more damage resistant electronic device touchscreen substrate and/or cover glass articles are met by the use of durable glass articles disclosed herein. These alkali-free/alkaline earth boroaluminosilicate glasses find particular use for those electronics devices such as, for example, cell phones, music players, notebook computers, game controllers, electronic book readers and other devices. These glass materials possess certain advantages such as improved damage/crack and scratch resistance over the presently used soda lime and alkali-containing boroaluminosilicate glass materials presently used as the touchscreen and cover glass materials.

In one embodiment these alkaline earth aluminoborosilicate glass are substantially free of alkalis and are comprised of the following constituents: (1) at least 55 mol % $SiO_2$; (2) at least 5 mol % $Al_2O_3$; and, (3) at least one alkaline earth RO. Certain constituent ratios are required so as to achieve glasses having the requisite damage/crack and scratch resistance, and particularly include: (1) an $Al_2O_3+B_2O_3$ to RO mol % ratio which exceeds 1; and, (2) an $Al_2O_3$ to RO mol % ratio which exceeds 0.65.

According to another embodiment, the alkaline earth aluminoborosilicate glass comprises the following constituents: 55-75 mol % $SiO_2$, 8-15 mol % $Al_2O_3$, 10-20 mol % $B_2O_3$; 0-8% MgO, 0-8 mol % CaO, 0-8 mol % SrO and 0-8 mol % BaO.

$SiO_2$ is a network component of the glass. In additional embodiments the $SiO_2$ is maintained at amounts between 59-64 mol %. If the $SiO_2$ content is below 55%, the chemical resistance of the glass is insufficient and the glasses strain point is lowered so that the heat resistance of the glass deteriorates unacceptably.

$Al_2O_3$ is a component which improves heat resistance and devitrification tendency of the glass. In additional embodiments the $Al_2O_3$ is maintained at amounts between 8-12 mol %, and in still further embodiments 8-10 mol %. If the $Al_2O_3$ content is less than 8%, a devitrification temperature is markedly elevated to result in the increased occurrence of devitrification in the glass. If the content exceeds 15%, the acid resistance, particularly the resistance to buffered hydrofluoric acid, is lowered to result in the increased occurrence of haze at a surface of the glass substrate.

$B_2O_3$ is a component which acts as a flux to lower the viscosity and thereby facilitate melting of the glass. In additional embodiments the $B_2O_3$ is maintained at amounts between 11-19 mol %. If the $B_2O_3$ content is less than 10%, its effect as a flux becomes insufficient. On the other hand, the higher $B_2O_3$ content tends to lower the acid resistance. Particularly when the $B_2O_3$ content is greater than 20%, the resistance of the glass decreases against hydrochloric acid and its strain point drops so that the heat resistance is lowered.

As described above, $B_2O_3$ is a component which affects the acid resistance of the glass. The reduction of its content improves the acid durability of the glass. A metal film or an ITO film is formed on a surface of a transparent glass substrate for use in liquid crystal displays. Since such a film is patterned by acid etching, the glass must have a high degree of acid resistance. It is accordingly desirable to reduce the $B_2O_3$ content in the glass. However, simple reduction of the $B_2O_3$ content may in turn raise other problems, including deterioration of the melting ability and increase of bubbles.

MgO is a component which lowers the high-temperature viscosity of the glass without a drop of the strain point and thereby facilitates melting of the glass. In a further embodiment the MgO content is 2-7%. If the MgO content is greater than 8%, the glass exhibits a marked reduction in resistance to buffered hydrofluoric acid.

CaO functions in a manner similar to MgO. In additional embodiments the CaO is maintained at amounts between 1-8 mol %. If the CaO content is greater than 8%, the glass exhibits a marked reduction in resistance to buffered hydrofluoric acid.

BaO is a component which improves not only the chemical durability but also devitrification tendency of the glass. If the BaO content is greater than 8%, a strain point drops to deteriorate the heat resistance of the glass.

SrO affects in a manner similar to BaO. In additional embodiments the SrO is maintained at amounts between 1-6 mol %. If the SrO content exceeds 8%, the occurrence of devitrification undesirably increases.

The aluminoborosilicate glasses disclosed herein exhibit the following properties: (1) a Vickers crack initiation load which is greater than 1000 gf; (2) a scratch resistance of at least 900 gf, as measured by the lack of the presence of lateral cracks when a load is applied by a moving Knoop indenter; (3) a Young's modulus value<75 GPa; and, (4) a molar volume>27.5 cm$^3$/mol. The glass material further exhibits further properties which render it particularly suitable for use as the electronic device touchscreen substrate including a linear coefficient of thermal expansion (CTE) over the temperature range 0-300° C. which satisfies the relationship: $25 \times 10{-}7/°C. \leq CTE \leq 40 \times 10{-}7/°C$.

In yet another embodiment, the glass article for use as a touchscreen substrate for use in a portable electronic device, comprises an alkali-free aluminosilicate glass exhibiting a high damage threshold of at least 1100 gf, as measured by the lack of the presence of median/radial cracks when a load is applied to the glass using a Vickers indenter. In a still further embodiment, the alkali-free aluminosilicate glass exhibits a high damage threshold of at least 1300 gf.

High damage threshold, defined as the lack of median/radial cracks up to applied loads of 1000 gf, can be measured using a Vickers indenter. Although there is no standard ASTM method for the Vickers indenter test, a useful testing method is described in articles by R. Tandon et al., "*Surface Stress Effects on Indentation Fracture Sequences*," J. Am. Ceram Soc. 73 [9] 2619-2627 (1990); R. Tandon et al., "*Indentation Behavior of Ion-Exchanges Glasses*," J. Am. Ceram Soc. 73 [4] 970-077 (1990); and P. H. Kobrin et al., "*The Effects of Thin Compressive Films on Indentation Fracture Toughness Measurements*," J. Mater. Sci. 24 [4] 1363-1367 (1989)]. Chem-tempered/strengthened SLS glasses tend to exhibit radial cracking at applied load levels in the range of applied load less than 1000 gf, and in most cases, loads of less than 800 gf.

Scratch resistance or median/radial crack threshold is measured using the Micro-Tribometer mod.UMT-2. The UMT is a commercial instrument (CETR Inc., Campbell, Calif.) that permits various form of tribological testing including scratch tests. An appropriate reference is V. Le Houerou et al., "*Surface Damage of Soda-lime-silica Glasses: Indentation Scratch Behavior*," J. Non-Cryst Solids, 316 [1] 54-63 (2003). In this test, a Knoop indenter is dragged across the surface with an ever increasing indentation load to a maximum load of 500 grams in approximately 100 seconds (so as to distinguish glass-to-glass differences). Chem-tempered/strengthened SLS glasses tend to exhibit lateral cracking at applied load levels in the range of applied load less than 500 g, and in most cases, loads of less than 200 g. As mentioned above, the alkali-free/alkaline earth aluminoborosilicate glass articles of the present disclosure generally exhibit the lack of the presence of lateral cracks up to applied loads of 900 gf.

In the present disclosure, a useful testing method which is a slight variation of the above is can be used to determine scratch resistance, as follows. The indenter load is applied from 0 kgf to the scratch load over the course of 45 seconds. The scratch is made at a constant load for a length of 10 mm at a scratch rate of 0.4 mm/s, so that the length of time over which the scratch takes place is 25 seconds. The load is removed from the scratch load to 0 kgf over the course of 45 seconds. The Knoop tip is oriented so that the leading edge contains the wide angle of the indenter. The scratch cracking threshold is defined as the scratch load that produces lateral cracks that extend in the direction perpendicular to the scratch plastic deformation track at a length of greater than 2 times the width of the scratch track. All scratch testing is performed at room temperature in 50% relative humidity.

This requisite high damage threshold (no median/radial cracks up to loads of 1000 gf) and scratch resistance (lack of lateral cracking up to loads of 900 gf) function to result in a touchscreen substrate which is sufficiently strong and durable so as to withstand typical consumer use/applications. In short, the alkali-free alkaline earth aluminosilicate glasses of the present embodiments provide substrates which exhibit a higher degree of damage resistance when compared to SLS glasses and thus would be highly beneficial for applications as an ITO or DITO substrate glass for touchscreens, particularly where mechanical reliability is of essence, and as cover glass articles for the same.

It is known that in typical aluminosilicate glasses the resulting deformation following Vickers indentation occurs in part by densification and in part by shear flow. However, the glass substrates described herein are formed from glass that undergoes minimal subsurface shear faulting, but instead undergoes indentation deformation primarily by densification under an indentation load of at least 1000 gf, which makes flaw/crack initiation more difficult. The densification mechanism described hereinabove can be attributed to the low level of non-bridging oxygens (NBOs) in the glass structure, high molar volume, low Young's modulus of the glass substrate, high $B_2O_3$ content, and the lack alkalis. While not wishing to be constrained by theory, one possible mechanism for the unusual role of alkaline earth cations in these glasses is that in comparison with alkalis, they are comparatively ineffective at stabilizing boron in tetrahedral coordination with oxygen. Tetrahedral boron results in a denser structure, making it less compressible, and thus subject to failure at lower loads. Thus avoiding tetrahedral boron is important to high crack initiation threshold value.

As noted above, these glasses are highly desirable for certain consumer electronic and display applications because they are substantially free of alkalis, are intrinsically resistant to median/radial and lateral crack formation, do not require ion exchange to obtain this attribute, and have physical properties similar to those used in conventional AMLCD applications. The glasses can provide enhanced damage resistance in liquid crystalline display applications. When used as a cover glass for portable devices the glasses will be more resistant to highly visible lateral crack damage surrounding scratches and point contacts than in ion-exchanged glasses. The alkaline earth alumino-borosilicate glasses will not be frangible which is a typical characteristic of certain ion-exchanged glasses.

Other advantages of using an alkali-free glass for the touchscreen substrate, particularly when compared to industry standard and currently utilized soda lime silicate (SLS) glasses, include the following (1)

It is not necessary to strengthen these glasses due to their inherent damage and scratch resistance, and therefore these glasses can be processed as full sheets and then laser cut without resultant warp typically seen when ion-exchanged SLS glasses are laser cut SLS;

The use of alkali-free alkaline earth aluminosilicate glasses which are formed using a down-draw process allows for the use of pristine thin glass (0.1-1 mm thick) whereas SLS glasses typically would require polishing to achieve these thinner specifications;

The lack of an ion-exchange process implies that processing temperatures can be higher than in ion-exchange glass, as ion-exchanged glasses need to be processed below the exchange temperature in order to ensure minimal ion mobility and resulting change in strength.

The disclosed alkali-free alkaline earth aluminosilicate touchscreen glass exhibits damage resistance which is closely matched to typical display glass, which in turn allows for a future hybrid integration of the ITO glass with the display glass;

The lack of ion-exchange implies edges that are uniform and not partially in compression and partially in tension, which should be contrasted with the characteristics of SLS glasses which when cut to size exhibit edges which are chemstrengthened only at the tops and bottom, with the bulk of the edges being non-strengthened and under tension. As a result, the alkali-free alkaline earth aluminosilicate touchscreen substrates are not prone to delayed failure from fatigue effects in the glass which is typically present in those substrates which have exposed edges under tension, and which will result in a reduction in strength of the edges with time. These delayed fatigue effects are likely correlated to the temperature or humidity or a combination thereof that the glass may be exposed to.

As mentioned hereinabove, the glass comprised of an alkali-free alkaline earth aluminosilicate glass find particular use as electronic device touchscreen substrates and cover glass articles material due to their sufficient durability and mechanical properties, particularly when compared to SLS glass based touchscreen substrates and cover glass articles.

EXAMPLES

Table I lists 13 alkali-free/alkaline earth aluminoborosilicate glasses within the claimed compositional and damage resistance scope described herein and Table II lists 16 comparative glasses.

Inasmuch as the sum of the individual constituents totals or very closely approximates 100, for all practical purposes the reported values may be deemed to represent mole percent. The actual batch ingredients may comprise any materials, either oxides, or other compounds, which, when melted together with the other batch components, will be converted into the desired oxide in the proper proportions. For example, $SrCO_3$ and $CaCO_3$ can provide the source of SrO and CaO, respectively.

The specific batch ingredients used to prepare the glasses of Table 1 were fine sand, alumina, boric acid, magnesium oxide, limestone, strontium carbonate or strontium nitrate, and tin oxide.

For examples 1-13 listed in Table I, and examples 14-29 listed in Table II, the melting was done in a laboratory scale, continuous, Joule-heated melter. Batches of the raw materials massing 45.4 kg were weighed into a mechanical mixer and combined together for five minutes. An amount of water corresponding to about 0.25 kg was added to the mixture during the last 60 seconds of mixing to reduce dust generation. The mixture was loaded using a screw feeder into a ceramic-lined furnace with tin oxide electrodes and opposing burners firing over the melt surface. The power supplied by the electrodes was controlled by keeping the glass at a near-constant resistivity, corresponding to temperatures between 1590° C. and 1610° C. The glass moved from the melter into a platinum-based conditioning system consisting of a high-temperature finer followed by a stir chamber. The finer and stir chamber temperatures were kept constant throughout the experiment, whereas the melt temperature of the ceramic-lined melter was allowed to vary with composition. The glass was drained out of the stir chamber through a heated orifice and was rolled into a ribbon approximately 5 mm thick and 30 mm wide. The glass from the ribbon was analyzed periodically for defects, which were identified, counted, and converted to defects per pound. Compositions were obtained from the ribbon via standard chemical methods, and physical properties were obtained as described below.

The glass properties set forth in Table I and II were determined in accordance with techniques conventional in the glass art. Thus, the linear coefficient of thermal expansion (CTE) over the temperature range 0-300° C. is expressed in terms of $\times 10^{-7}/°$ C. and was determined from fiber elongation technique, ASTM references E228-85. Young's modulus values in terms of Mpsi were determined using a resonant ultrasonic spectroscopy technique of the general type set forth in ASTM E1875-00e1.

The crack initiation load was measured in the following manner and is also reported in Tables I and II. The load was applied and removed at 0.2 mm/min. The maximum load was held for 10 seconds. The indentation cracking threshold is defined at the indentation load at which 50% of 10 indents exhibit any number of radial/median cracks emanating from the corners of the indent impression. The maximum load was increased until the threshold was met for a given glass composition. All indentation was performed at room temperature in 50% relative humidity.

TABLE I

|  | 1 | 2 | 3 | 4 | 5 | 6 | 7 | 8 | 9 | 10 | 11 | 12 | 13 |
|---|---|---|---|---|---|---|---|---|---|---|---|---|---|
| $SiO_2$ | 63.7 | 63.71 | 63.71 | 63.7 | 63.7 | 59.92 | 63.91 | 63.91 | 63.90 | 63.90 | 63.92 | 63.91 | 63.92 |
| $Al_2O_3$ | 13.18 | 11.68 | 10.18 | 8.69 | 7.19 | 9.43 | 8.49 | 8.49 | 8.48 | 8.49 | 8.49 | 8.49 | 8.49 |
| $B_2O_3$ | 11.99 | 13.48 | 14.98 | 16.48 | 17.98 | 18.31 | 16.48 | 16.48 | 16.48 | 16.48 | 16.48 | 16.48 | 16.48 |
| MgO | 2.2 | 2.2 | 2.21 | 2.21 | 2.21 | 2.51 | 4.25 | 6.25 | 3.25 | 4.25 | 0.25 | 2.25 | 1.24 |
| CaO | 5.2 | 5.2 | 5.2 | 5.19 | 5.19 | 5.82 | 3.24 | 1.25 | 3.25 | 1.25 | 7.24 | 7.25 | 7.24 |
| SrO | 3.59 | 3.59 | 3.59 | 3.59 | 3.59 | 3.88 | 3.49 | 3.49 | 4.50 | 5.49 | 3.49 | 1.50 | 2.50 |
| BaO | 0.03 | 0.03 | 0.03 | 0.03 | 0.03 | 0.03 | 0.03 | 0.03 | 0.03 | 0.04 | 0.03 | 0.01 | 0.02 |
| $SnO_2$ | 0.1 | 0.1 | 0.1 | 0.1 | 0.1 | 0.10 | 0.10 | 0.10 | 0.10 | 0.10 | 0.10 | 0.10 | 0.10 |
| $Fe_2O_3$ | 0.01 | 0.01 | 0.01 | 0.01 | 0.01 | 0.01 | 0.01 | 0.01 | 0.01 | 0.01 | 0.01 | 0.01 | 0.01 |
| $ZrO_2$ | 0.01 | 0.01 | 0.01 | 0.01 | 0.01 | 0.00 | 0.00 | 0.00 | 0.00 | 0.00 | 0.00 | 0.00 | 0.00 |
| Crack Initiation load (gf) | 1100 | 1100 | 1100 | 1300 | 1000 | 1100 | 1300 | 1300 | 1200 | 1200 | 1100 | 1000 | 1100 |
| Molar Volume (cm³/mol) | 27.76 | 27.80 | 27.84 | 27.87 | 27.91 | 27.90 | 27.78 | 27.72 | 27.83 | 27.82 | 27.92 | 27.80 | 27.86 |
| Young's Modulus (Gpa) | 73.08 | 71.02 | 68.26 | 65.50 | 63.43 | 65.50 | 66.19 | 66.88 | 65.50 | 65.50 | 64.81 | 66.19 | 65.50 |
| RO | 11.02 | 11.02 | 11.03 | 11.02 | 11.02 | 12.24 | 11.01 | 11.02 | 11.03 | 11.03 | 11.01 | 11.01 | 11 |
| $R_2O_3$ | 25.17 | 25.16 | 25.16 | 25.17 | 25.17 | 27.74 | 24.97 | 24.97 | 24.96 | 24.97 | 24.97 | 24.97 | 24.97 |
| $RO/R_2O_3$ | 0.44 | 0.44 | 0.44 | 0.44 | 0.44 | 0.44 | 0.44 | 0.44 | 0.44 | 0.44 | 0.44 | 0.44 | 0.44 |

TABLE I-continued

|  | 1 | 2 | 3 | 4 | 5 | 6 | 7 | 8 | 9 | 10 | 11 | 12 | 13 |
|---|---|---|---|---|---|---|---|---|---|---|---|---|---|
| $R_2O_3/RO$ | 2.28 | 2.28 | 2.28 | 2.28 | 2.28 | 2.27 | 2.27 | 2.27 | 2.26 | 2.26 | 2.27 | 2.27 | 2.27 |
| $Al_2O_3/RO$ | 1.20 | 1.06 | 0.92 | 0.79 | 0.65 | 0.77 | 0.77 | 0.77 | 0.77 | 0.77 | 0.77 | 0.77 | 0.77 |

TABLE II

|  | 14 | 15 | 16 | 17 | 18 | 19 | 20 | 21 | 22 | 23 |
|---|---|---|---|---|---|---|---|---|---|---|
| $SiO_2$ | 69.77 | 69.9 | 69.76 | 69.79 | 69.8 | 69.77 | 69.78 | 69.81 | 69.8 | 69.9 |
| $Al_2O_3$ | 12.46 | 14.99 | 9.96 | 12.46 | 14.96 | 7.47 | 9.987 | 12.47 | 9.97 | 7 |
| $B_2O_3$ | 0 | 0 | 2.5 | 2.5 | 2.49 | 4.99 | 4.98 | 4.98 | 7.48 | 10.49 |
| MgO | 0.16 | 0.13 | 0.16 | 0.13 | 0.12 | 0.16 | 0.14 | 0.11 | 0.11 | 0 |
| CaO | 17.44 | 14.98 | 17.45 | 14.96 | 12.47 | 17.45 | 14.95 | 12.47 | 12.47 | 12.5 |
| SrO | 0 | 0 | 0 | 0 | 0 | 0 | 0 | 0 | 0 | 0 |
| BaO | 0 | 0 | 0 | 0 | 0 | 0 | 0 | 0 | 0 | 0 |
| $SnO_2$ | 0.15 | 0.15 | 0.15 | 0.15 | 0.15 | 0.15 | 0.15 | 0.15 | 0.15 | 0.1 |
| $Fe_2O_3$ | 0.01 | 0.01 | 0.01 | 0.01 | 0.01 | 0.01 | 0.01 | 0.01 | 0.01 | 0.01 |
| $ZrO_2$ | 0.01 | 0.01 | 0.01 | 0.01 | 0.01 | 0.01 | 0.01 | 0.01 | 0.01 | 0.01 |
| Crack Initiation load (gf) | 200 | 200 | 200 | 200 | 400 | 100 | 400 | 700 | 600 | 900 |
| Molar Volume ($cm^3$/mol) | 25.59 | 26.18 | 25.61 | 26.18 | 26.74 | 25.65 | 26.21 | 26.78 | 26.83 | 26.90 |
| Young's Modulus (Gpa) | 86.87 | 87.56 | 82.05 | 83.43 | 84.12 | 77.91 | 79.29 | 79.98 | 75.84 | 70.33 |
| RO | 17.6 | 15.11 | 17.61 | 15.09 | 12.59 | 17.61 | 15.09 | 12.58 | 12.58 | 12.5 |
| $R_2O_3$ | 12.46 | 14.99 | 12.46 | 14.96 | 17.45 | 12.46 | 14.95 | 17.45 | 17.45 | 17.49 |
| $RO/R_2O_3$ | 1.41 | 1.01 | 1.41 | 1.01 | 0.72 | 1.41 | 1.01 | 0.72 | 0.72 | 0.71 |
| $R_2O_3/RO$ | 0.71 | 0.99 | 0.71 | 0.99 | 1.39 | 0.71 | 0.99 | 1.39 | 1.39 | 1.40 |
| $Al2O_3/RO$ | 0.71 | 0.99 | 0.57 | 0.83 | 1.19 | 0.42 | 0.66 | 0.99 | 0.79 | 0.56 |
| Comments | Excess NBO High Mod. Low Mol. Vol. | Some NBO High Mod. Low Mol. Vol. | Excess NBO High Mod. Low Mol. Vol. | Some NBO High Mod. Low Mol. Vol. | High Mod. Low Mol. Vol. | Excess NBO High Mod. Low Mol. Vol. | Some NBO High Mod.; Low Mol. Vol. | High Mod. Low Mol. Vol. | High Mod. Low Mol. Vol. | Low Mol. Vol. |

|  | 24 | 25 | 26 | 27 | 28 | 29 |
|---|---|---|---|---|---|---|
| $SiO_2$ | 69.89 | 69.89 | 69.9 | 69.89 | 63.90 | 63.89 |
| $Al_2O_3$ | 6 | 10 | 8.5 | 7 | 8.49 | 8.49 |
| $B_2O_3$ | 11.49 | 9.99 | 11.5 | 12.99 | 16.48 | 16.47 |
| MgO | 0 | 0 | 0 | 0 | 2.25 | 2.25 |
| CaO | 12.5 | 10 | 10 | 10 | 3.25 | 1.25 |
| SrO | 0 | 0 | 0 | 0 | 5.49 | 7.49 |
| BaO | 0 | 0 | 0 | 0 | 0.04 | 0.05 |
| $SnO_2$ | 0.1 | 0.1 | 0.1 | 0.1 | 0.10 | 0.10 |
| $Fe_2O_3$ | 0.01 | 0.01 | 0.01 | 0.01 | 0.01 | 0.01 |
| $ZrO_2$ | 0.01 | 0.01 | 0.01 | 0.01 | 0.00 | 0.00 |
| Crack Initiation load (gf) | 600 | 800 | 800 | 900 | 800 | 900 |
| Molar Volume ($cm^3$/mol) | 26.92 | 27.47 | 27.51 | 27.55 | 27.88 | 27.93 |
| Young's Modulus (Gpa) | 68.95 | 72.39 | 69.64 | 66.88 | 64.81 | 64.12 |
| RO | 12.5 | 10 | 10 | 10 | 11.03 | 11.04 |
| $R_2O_3$ | 17.49 | 19.99 | 20 | 19.99 | 24.97 | 24.96 |
| $RO/R_2O_3$ | 0.71 | .50 | 0.50 | 0.50 | 0.44 | 0.44 |
| $R_2O_3/RO$ | 1.40 | 2.00 | 2.00 | 23.00 | 2.26 | 2.26 |
| $Al2O_3/RO$ | 0.48 | 1.00 | 0.85 | 0.70 | 0.77 | .077 |
| Comments | Low Mol. Vol. | Low Mol. Vol. | Low Mol. Vol. | Low Mol. Vol. | High Mol % Sr | High Mol % Sr |

Figure 1:
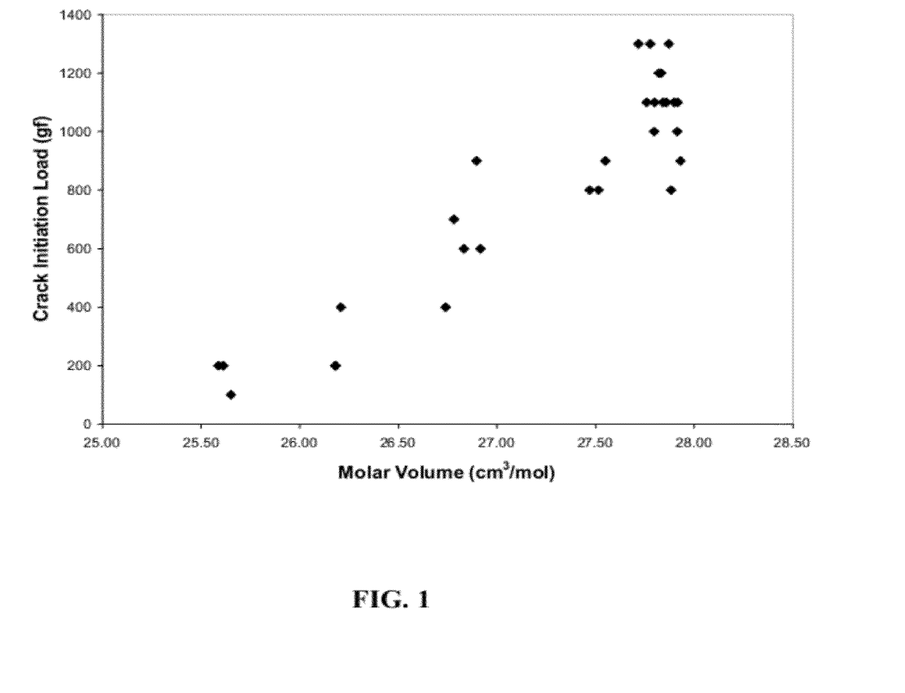
FIG. 1 is a plot of the measured crack initiation threshold vs. the molar volume relationship for the alkaline earth aluminoborosilicate glass samples disclosed herein

Illustrated in FIG. 1 is a plot of the measured crack initiation threshold vs. the molar volume relationship for the alkali-free/alkaline earth aluminoborosilicate glass samples disclosed herein and for the comparative glass samples. An observation of the graph reveals that all of the alkali-free/alkaline earth aluminoborosilicate glass samples (1-13) exhibit a molar volume in excess of 27.5, thus emphasizing that exhibiting a molar volume in excess of 27.5 is a critical contributing factor to achieving a crack initiation load of 1000 gf or greater.

Figure 2:
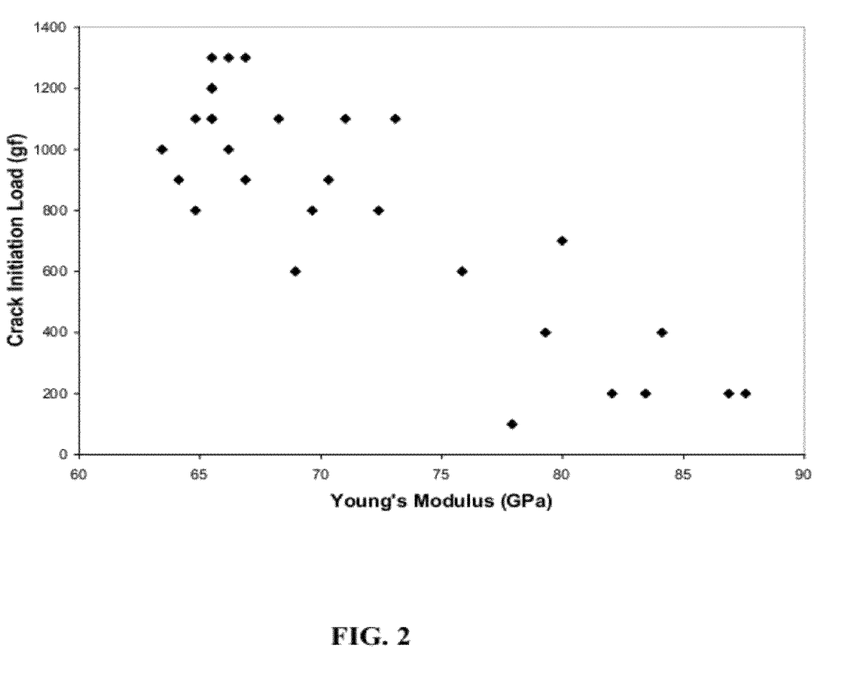
FIG. 2 is a plot of the measured crack initiation threshold vs. the Young's modulus for the alkaline earth aluminoborosilicate glass samples disclosed herein.

Illustrated in FIG. 2 is a plot of the measured crack initiation threshold vs. the Young's modulus for the alkali-free alkaline earth aluminoborosilicate glass samples disclosed herein and for the comparative glass samples. An observation of the graph reveals that all of the alkali-free/alkaline earth aluminoborosilicate glass samples (1-13) exhibit a Young's modulus less than 75 GPa, thus emphasizing that exhibiting a Young's Modulus less than 75 GPa is a critical contributing factor to achieving a crack initiation load of 1000 gf or greater.

Figure 3A:
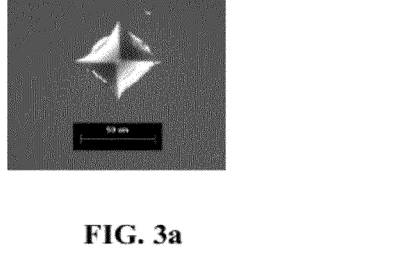
FIG. 3a is a microscopic image top view of a 1 kilogram force (kgf) Vickers indentation for one representative alkaline earth aluminoborosilicate glass sample disclosed herein.
Figure 3B:
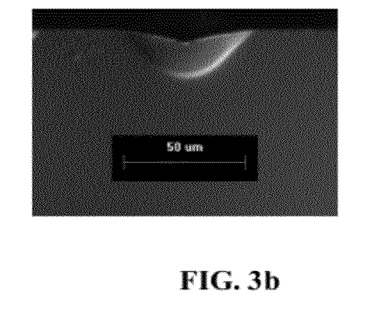
FIG. 3b is a microscopic image cross-sectional view of a 1 kilogram force (kgf) Vickers indentation for one representative alkaline earth aluminoborosilicate glass sample disclosed herein.

Illustrated in FIGS. 3a and 3b are the surface (or top) and cross-sectional microscopic images for glass sample number 4 from Table I which was subject to a 1 kilogram force (kgf) Vickers indentation; this sample exhibited a high crack initiation load (gf) as measured of 1300 gf. As seen in the top view (FIG. 3a) the Vickers indented sample exhibits no median/radial cracks extending from the Vickers indentation point. As seen in the cross-sectional view (FIG. 3b), the glass deforms primarily by densification with no observable shear faulting. Furthermore, the lack of the shear lines reveals that plastic flow plays a lesser role in the deformation of this glass when compared to glasses more prone to cracking such as those comparative glasses described later. It is expected that the other highly crack resistant aluminoborosilicate glass samples investigated (1-3 & 5-13) will deform in an manner similar to that exhibited by example 4, where the amount of the overall deformation occurring by densification will be larger than in glasses with lower crack initiation loads, such as those comparative glass 14-29.

Figure 4A:
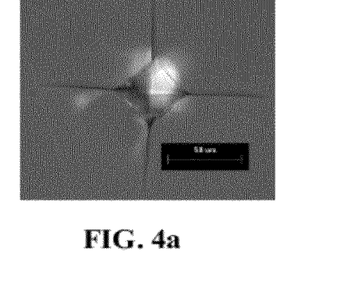
FIG. 4a is a microscopic image top view of a 1 kilogram force (kgf) Vickers indentation for a comparative glass substrate.
Figure 4B:
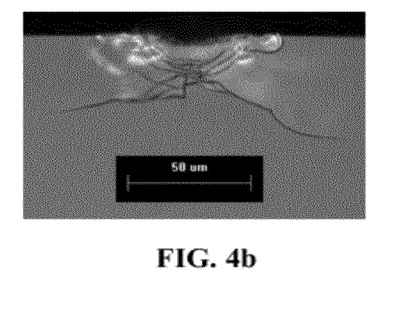
FIG. 4b is a microscopic image cross-sectional view of a 1 kilogram force (kgf) Vickers indentation for a comparative glass substrate.

Illustrated in FIGS. 4a and 4b are the surface (or top) and cross-sectional microscopic images for glass sample number 14 from Table II which was subject to a 1 kilogram force (kgf) Vickers indentation; this sample exhibited a very low crack initiation load (gf) as measured of 200 gf. As seen in the top view (FIG. 4a) the Vickers indented sample exhibits significant median/radial cracks extending from the Vickers indentation. As seen in the cross-sectional view (FIG. 4b), this comparative glass deforms with less densification and more shear than the alkali-free/alkaline earth aluminoborosilicate example 4 glass above. Specifically, it is evident that shear deformation occurs as a larger component of the deformation by the presence of shear lines in the subsurface. These shear lines (shear cracks) initiate the larger crack systems, median/radial cracks, that are observed at the crack initiation threshold.

Various modifications and variations can be made to the materials, methods, and articles described herein. Other aspects of the materials, methods, and articles described herein will be apparent from consideration of the specification and practice of the materials, methods, and articles disclosed herein. It is intended that the specification and examples be considered as exemplary.

We claim:

1. An alkaline earth aluminoborosilicate glass, the aluminoborosilicate glass being substantially free of alkali metals, comprising: 59-64 mol % $SiO_2$; 8-12 mol % $Al_2O_3$; 11-19 mol % $B_2O_3$; 2-7 mol % MgO, 1-8 mol % CaO, 1-6 mol % SrO and 0-6 mol % BaO, wherein $Al_2O_3$ (mol %)+$B_2O_3$ (mol %)/RO (mol %)>2.25 and $Al_2O_3$ (mol %)/RO (mol %)>0.65.

2. The alkaline earth aluminoborosilicate glass of claim 1 which exhibits a Vickers median/radial crack initiation threshold of at least 1000 gf.

3. The alkaline earth aluminoborosilicate a glass of claim 1 which exhibits a Vickers median/radial crack initiation threshold of at least 1100 gf.

4. The alkaline earth aluminoborosilicate glass of claim 1 which exhibits a Vickers median/radial crack initiation threshold of at least 1300 gf.

5. The alkaline earth aluminoborosilicate glass of claim 1 which exhibits a scratch resistance of at least 900 gf, as measured by the lack of the presence of lateral cracks when a load is applied by a moving Knoop indenter.

6. The alkaline earth aluminoborosilicate glass of claim 1 wherein the glass exhibits a linear coefficient of thermal expansion (CTE) over the temperature range 0-300° C. which satisfies the relationship: $25 \times 10^{-7}/° C. \leq CTE \leq 40 \times 10^{-7}/° C.$ 7. The alkaline earth aluminoborosilicate glass of claim 1 wherein the glass is substantially non-frangible.

8. The alkaline earth aluminoborosilicate glass of claim 1, wherein the glass has a molar volume of at least 27.5 $cm^3$/mol.

9. The alkaline earth aluminoborosilicate glass of claim 1, wherein the aluminoborosilicate glass has a Young's modulus of less than about 75 MPa.

* * * * *